March 22, 1960 F. M. WEIL 2,930,040
RADIATION POLARIZATION CONTROL
Filed Oct. 7, 1955 3 Sheets-Sheet 1

FREDERICK M. WEIL,
INVENTOR.

BY
Barkelew & Scantlebury
ATTORNEYS.

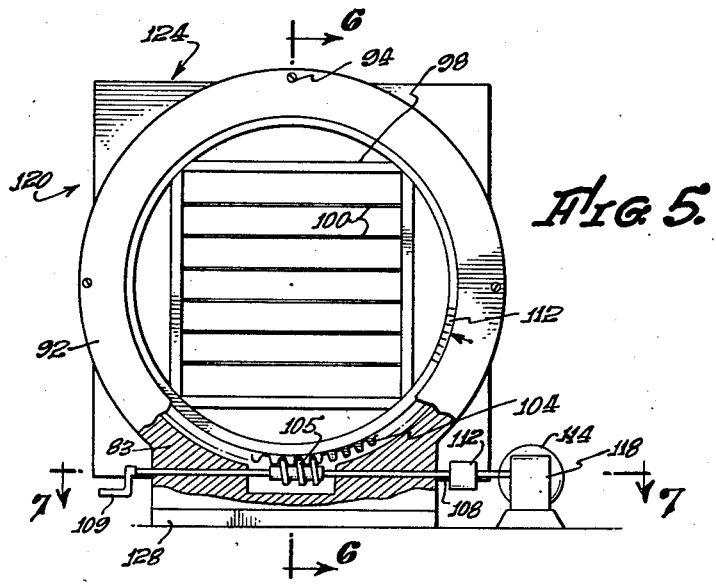
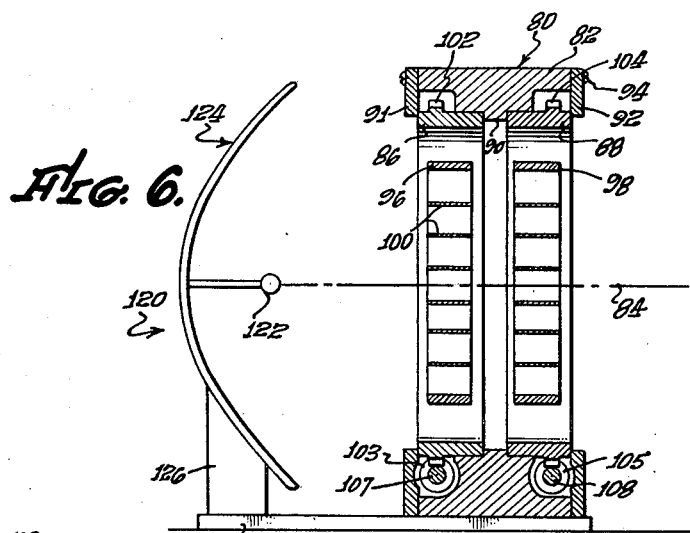

March 22, 1960     F. M. WEIL     2,930,040
RADIATION POLARIZATION CONTROL
Filed Oct. 7, 1955     3 Sheets-Sheet 3

INVENTOR.
FREDERICK M. WEIL,
BY

United States Patent Office 2,930,040
Patented Mar. 22, 1960

2,930,040

RADIATION POLARIZATION CONTROL

Frederick M. Weil, La Canada, Calif., assignor to Gilfillan Bros. Inc., Los Angeles, Calif., a corporation of California Application October 7, 1955, Serial No. 539,049

1 Claim. (Cl. 343—756)

This invention has to do with means for controlling the polarization characteristics of radiofrequency electromagnetic radiation.

A primary object of the invention is to provide convenient and economical means for converting such radiation between a condition of linear polarization in a predetermined plane and an arbitrarily selected condition of polarization.

The invention is particularly useful in the field of relatively high radiofrequencies, such as are typically used in radar systems. For that reason, the invention will be described primarily as it pertains to that field of use, but without thereby implying any limitation upon its scope.

In accordance with one aspect of the present invention, means are provided by which linearly polarized radiofrequency radiation may be transformed into radiation having arbitrarily selected polarization characteristics. Thus, for example, linearly polarized radiation from any convenient source, such as a radar antenna, may be transformed at will into radiation circularly polarized in either sense, into radiation linearly polarized in a plane having arbitrarily selected orientation with respect to the initial plane of polarization, or into elliptically polarized radiation having any desired orientation, ellipticity and sense of rotation.

A further aspect of the invention concerns antenna systems especially adapted for producing or receiving radiation of any arbitrarily selected type of polarization. Thus, an antenna that is normally responsive only to the radiation component that is linearly polarized in a definite plane may be made responsive with substantially normal efficiency to radiation having any selected polarization characteristics. For example, such an antenna may be made responsive to radiation linearly polarized in a plane perpendicular to its plane of normal response, and may be made substantially non-responsive to radiation linearly polarized in its plane of normal response.

Such antenna systems are useful, for example, in the military field for producing radiation for countermeasures against communication by an enemy, and are also useful in connection with anti-countermeasures to protect friendly communications from being jammed by an enemy. An important feature of the invention for the latter purpose is the fact that an antenna system that is capable of producing radiation having any particular type of polarization is typically incapable of receiving radiation having the exactly opposite type of polarization. Hence the invention, by permitting the arbitrary selection of the type of radiation to which an antenna system is responsive, also permits the antenna system to be made unresponsive to any arbitrarily selected type of radiation.

Thus, for example, if a radar system having an antenna system in accordance with the present aspect of the invention is required to operate in the presence of enemy-produced radiation, it is only necessary to determine the type of polarization of that radiation, which may be done by analysis or by experiment, for example, and then adjust the antenna system to be responsive to radiation of opposite polarization. That adjustment of the antenna system will enable it to operate effectively, and yet make it substantially non-responsive to the countermeasure radiation. In communication systems in which separate sending and receiving antennas are employed, it may be useful to adjust separately the sending and receiving antennas in the manner described. In systems using the same antenna for sending and receiving, as is typically true of radar systems, the corresponding adjustment of that single antenna is sufficient.

A further aspect of the invention provides means for producing or receiving radiofrequency radiation having rapidly varying polarization characteristics. The polarization of emitted radiation, for example, may be caused to vary continuously in a cyclic manner that repeats periodically; or the variation may readily be made relatively complex, so that in effect there is no definite period of repetition. A receiving antenna system may similarly be caused to vary continuously as to the polarization characteristics of the radiation that it receives and that it rejects. Separate sending and receiving antennas may, for example, be caused to vary in a coordinated manner, so that the nature of the radiation emitted by one will vary continuously but will always be received effectively by the other; or will always be excluded by the other. The former relation is particularly suitable for maintaining communications in the face of jamming radiation of variable type. The latter relation permits production of countermeasure radiation that is difficult for an enemy to counter, but to which one's own communication channels are substantially non-responsive.

It is well known that the condition of polarization of radiofrequency radiation can be modified in certain limited respects by transmission through a suitably oriented structure that produces a phase shift between the radiation components polarized in two mutually perpendicular planes. Such a structure that produces a characteristic phase shift of 90° will be referred to for convenience as a "phase shifting device." Thus, for example, linearly polarized radiofrequency radiation produced by a typical antenna structure can be transformed by transmission through such a phase shifting device into circularly polarized radiation, or into elliptically polarized radiation having a particular relation between the ellipticity, the direction of the major axis of the ellipse and the sense of rotation of the polarization vector. However, such a phase shifting device is not capable of transforming radiation that is polarized in a definite plane into radiation having any arbitrarily selected type of polarization.

It has now been discovered that the condition of polarization of radiation can be transformed between linear polarization in a definite plane of polarization and an arbitrarily selected condition of polarization. In accordance with the present invention, that may be accomplished by causing the radiation to traverse successively two phase shifting devices that are suitably oriented with respect to each other and to the said plane of polarization. The phase shifting devices may be devices of any suitable type which transmit radiofrequency radiation and which interact with the transmitted radiation to produce a predetermined change of phase between the radiation components polarized parallel and perpendicular to a definite reference plane, which is substantially parallel to the direction of radiation propagation. The phase shifting devices are preferably mounted in the path of the radiation in such a way that their respective reference planes may be adjustably rotated about the direction of radiation propagation to produce a desired angular relation of those planes with respect to each other and to the plane of polarization of the radiation.

For certain special purposes, as when only a particular type of transformation is required, it may be sufficient that the two phase shifting devices be mounted in definite angular relation to the plane of polarization of the radiation to be modified, the angular positions of the respective devices being determined in accordance with the particular type of polarization transformation that is to be produced. Or, if only certain limited classes of such transformations are required, it may be sufficient to mount one device in suitable fixed orientation, and to provide adjustment only for the other. Ordinarily, however, it is preferred that both phase shifting devices be rotatable with respect to the definite plane of polarization of the linearly polarized radiation, whether that radiation is incident upon the first device or is to be produced after successive transmission by the two devices.

For most purposes, it is preferred in accordance with the invention that the phase shift produced by each of the phase shifting devices be substantially equal to 90°. However, many of the objectives of the invention can be at least partially obtained with phase shifting devices one or both of which produce phase shifts different from 90°. Systems of the latter type are capable of producing many different types of polarization, but are generally less flexible and less convenient in operation.

A full understanding of the invention and of its further objects and advantages will be had from the following description of certain embodiments, the accompanying drawings forming a part of that description. The embodiments of the invention selected for description and the particulars of those embodiments are intended for illustration and not as a limitation upon the scope of the invention, which is defined by the appended claim.

In the drawings:

Fig. 5 is an end elevation, partly cut away, representing an illustrative embodiment of the invention;

Fig. 6 is an axial section on line 6—6 of Fig. 5;

Fig. 7 is a horizontal section on line 7—7 of Fig. 5;

The term "phase shifting device" is employed herein with reference to any device that causes a phase difference of substantially 90 degrees between transmitted components of radiation polarized parallel and perpendicular, respectively, to a definite reference plane. That reference plane is typically fixed with respect to the device and parallel to the direction of propagation of the radiation.

Such a phase shifting device may be constructed in many different ways. One illustrative example is adapted for use in connection with radiation in free space and comprises a grid of thin flat blades or vanes of electrically conductive material arranged in mutually parallel relation and having dimensions suitably related to the wavelength of the radiation. The reference plane of such a device is typically taken parallel to the vanes. Another illustrative type of phase shifting device is adapted for use in a circular wave guide and may comprise, for example, an internal longitudinal ridge which changes the effective width of the wave guide for radiation having its electric vector in the axial plane of the ridge, but which has small effect on radiation polarized normal to that plane.

Figure 1:
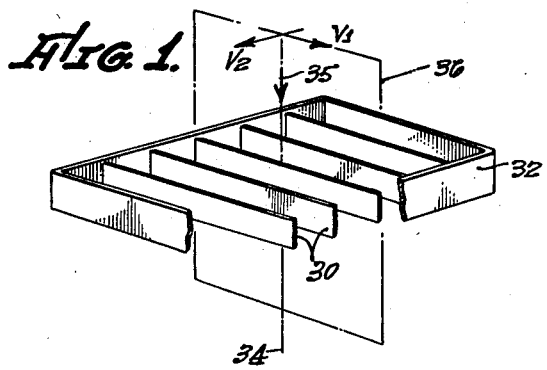
Fig. 1 is a schematic perspective representing an illustrative type of phase shifting device.

Fig. 1 represents an illustrative phase shifting device of grid type, suitable, for example, for use in accordance with the invention in connection with beams of radio-frequency radiation. The thin flat vanes 30 of electrically conductive material are supported in any suitable manner, as by the frame 32, in parallel spaced relation. When radiation is transmitted perpendicularly through the grid of vanes 30, along an axis 34, as indicated by the arrow 35, a change of phase is produced between the radiation components polarized parallel and perpendicular, respectively, to the reference plane 36, which is taken parallel to the length of the vanes. Such radiation components are indicated by the electric vectors $V_1$ and $V_2$, respectively. The resulting difference of phase for radiation of any given frequency may be controlled in known manner by appropriate selection of the width and spacing of the vanes 30. In particular, that phase difference may be made equal to substantially 90° or $\pi/2$.

Figure 3:
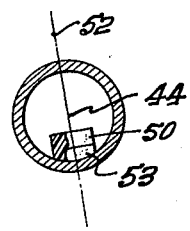
Fig. 3 is a transverse section on line 3—3 of Fig. 2.
Figure 2:
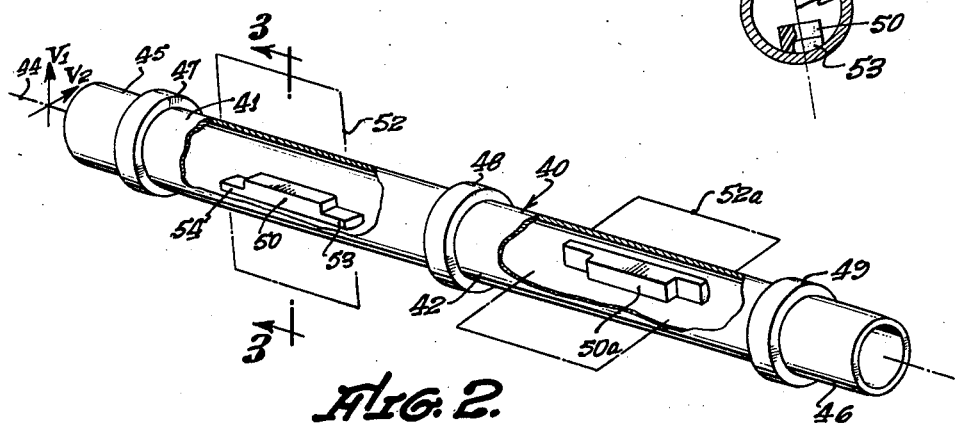
Fig. 2 is a schematic perspective representing a further illustrative type of phase shifting device.

Fig. 2 represents an illustrative type of phase shifting device adapted for use in a wave guide in accordance with the invention. A wave guide is indicated generally at 40 with longitudinal axis 44. Two adjacent intermediate sections 41 and 42 of wave guide 40 are preferably mounted between end sections 45 and 46 in a manner to permit relative rotation of the sections about axis 44. Rotary joints of conventional type are indicated schematically at 47, 48 and 49. At least the intermediate sections 41 and 42 of wave guide 40 are preferably of circular section, as illustratively shown. An obstruction is provided within each intermediate section, having typically the form of a ridge parallel to axis 44 and extending inwardly from one wall in a definite axial plane. That ridge forms a distributed reactance for the radiation component polarized parallel to the axial plane, and is equivalent to a change of width of the wave guide for such radiation; but has small effect upon radiation polarized perpendicular to that plane. Illustrative ridge-like obstructions in the wave guide sections 41 and 42 are indicated at 50 and 50a, respectively, lying in axial reference planes 52 and 52a, respectively. Radiation may be considered to enter the wave guide from the left, as seen in Fig. 3. The radiation components initially polarized parallel and perpendicular to reference plane 52 of the first phase shifting device are represented by the electric vectors $V_1$ and $V_2$, respectively. Since ridge 50 makes the effective width of the wave guide different for two components such as $V_1$ and $V_2$ transmitted along the wave guide, a change of phase is produced between them. The ridges 50 and 50a are preferably provided with end portions 53 and 54 of lesser height than the main body of the ridge to provide improved matching between the ridged and unridged portions of the wave guide. By selection of suitable dimensions for ridges 50 and 50a, the resulting phase difference may be given any desired value for radiation of predetermined frequency. In particular, that phase difference may be made substantially equal to 90°.

Figure 4:
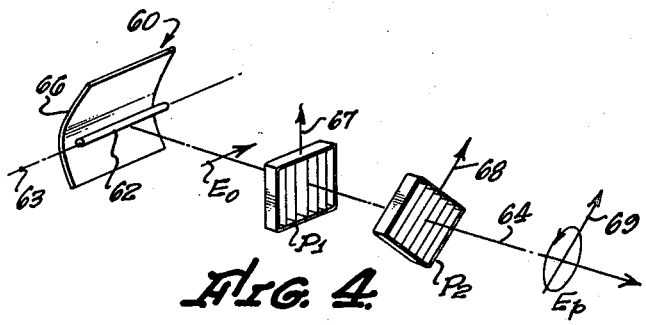
Fig. 4 is a schematic perspective illustrating the invention.

Fig. 4 represents schematically an illustrative antenna system in accordance with one aspect of the invention. An antenna is represented at 60, comprising any suitable structure capable of interacting with a radiation field that is linearly polarized. That structure may, for example, comprise a linear array of radiating elements, indicated in block form at 62, capable of interacting with a radiation field polarized parallel to the axis 63 of the array. Such a radiation field is represented by the electric vector $E_0$. Beam-forming means are preferably provided to produce concentration of the radiation field along a beam axis, represented at 64. For example, a cylindrical reflector 66 may be supported in any suitable manner with its focus coaxial with array 62.

Two phase shifting devices are represented in Fig. 4 at $P_1$ and $P_2$, respectively, arranged for successive transmission of radiation received or emitted by antenna 60 along axis 64. Those devices, which may be of any suitable type, are illustratively shown as of the grid type already described. In Fig. 4 the angular positions of the reference planes of devices $P_1$ and $P_2$ with respect to electric vector $E_0$ are indicated by the arrows 67 and 68, respectively, which are parallel to the length of the vanes of the respective grids. The position angles of the respective grids are preferably adjustable, as by the illustrative means to be described. For any particular set of angular positions of the two phase changing devices, there is some definite type of radiation field $E_p$ outward of the grids that corresponds to the linearly polarized radiation field $E_o$ adjacent antenna 60. The field $E_p$ is represented schematically in Fig. 4 as an ellipse with its major axis, indicated by the arrow 69, at some definite angle with respect to $E_o$. In accordance with the present invention, any arbitrary type of polarization of radiation $E_p$ can be produced by some definite set of angular positions of the two devices $P_1$ and $P_2$.

An illustrative arrangement for controlling the position angles of two successive phase shifting devices is represented in Figs. 5, 6 and 7. A rigid support 80 comprises a cylindrical sleeve 82 mounted, as by a bracket formation 83, with its axis 84 in any required orientation, shown illustratively as horizontal. Two circular frames 86 and 88 are coaxially mounted in support 80 in rotatable relation, as by being freely received in peripheral channels which are formed in the inner surface of the sleeve 82 between the central inwardly extending flange 90 and the respective retaining rings 91 and 92. The latter may be removably secured to the end faces of sleeve 82, as by the screws 94, providing convenient disassembly of the mechanism.

Each of the frames 86 and 88 carries structure of any desired type forming a phase shifting device. As shown, square frames 96 and 98 are fixedly mounted in the respective circular frames, and carry transversely spaced vanes 100 of thin conductive material arranged in parallel relation to form grids of the type already described.

Any suitable means may be provided for driving the frames 86 and 88 with their carried grids to the desired respective angular positions. For example, worm gear teeth may be formed integrally or otherwise on each of the circular frames, as indicated at 102 and 104, and may be drivingly engaged by worms 103 and 105, respectively, which are mounted on shafts 107 and 108 suitably journaled in support 80. Worm shafts 107 and 108 may be driven by any suitable means for producing the desired adjustment of the phase shifting devices. Such means are shown illustratively as the respective hand cranks 109 and 110. Scale indications are preferably provided, as indicated schematically at 112, to facilitate reading of the actual angular position of each grid.

Support 80 may be mounted in any suitable manner in the path of radiation the condition of polarization of which is to be modified. For example, support 80 may be mounted in fixed relation to an antenna formation, which may be of the illustrative type of Fig. 4. Such an antenna is indicated at 120, with horizontal linear array 122, cylindrical reflector 124 and supporting bracket 126. Bracket 126 and frame 80 may be mounted on a common base 128, with the beam axis of the antenna coinciding with axis 84. Base 128, in turn, may be mounted in any required manner, which may, for example, include provision, not explicitly shown, for scansion movement of axis 84.

In accordance with another aspect of the invention, means of any suitable type may be provided for driving the respective phase shifting devices continuously. For example, as illustrated schematically in Figs. 5 and 7, an electric motor 114 may drive a shaft 115, which is connected via respective speed control devices 117 and 118 to the shafts 107 and 108 of the respective phase shifting devices. Speed control devices 117 and 118 may, for example, comprise gear boxes of conventional type, and may be adjustable to vary the speed ratio between the driving and driven shafts. Suitable clutch means may be provided between each of the shafts 107 and 108 and its speed control device, as indicated schematically at 111 and 112, so that the power drive means may conveniently be disconnected when the phase shifting devices are to be adjusted manually.

In particular, if the two phase shifting devices are driven at equal speed, the condition of polarization of the radiation produced by such an antenna system as is shown in Figs. 5 to 7 is caused to vary periodically with a period equal to the common period of revolution of the devices. The same is true of the condition of polarization of incoming radiation that is received with full effectiveness (or that is rejected) by such an antenna system. If the two phase shifting devices are driven at different speeds, one of which is an integral multiple of the other, then the polarization characteristic of the antenna system varies periodically with a period typically equal to that of the slower device. If the periods of rotation of the two devices are proportional to respective integers, say $m$ and $n$, the polarization characteristic varies periodically with a period that typically equals the product of $m$ by $n$. Moreover, if the two devices are driven at different speeds that are entirely incommensurable, for example with periods proportional to 2 and $\sqrt{2}$, respectively, the polarization varies continuously in a pattern that does not have any period of repetition. The latter type of drive is particularly useful in the military fields already outlined.

One or both of the devices 117 and 118 in Fig. 7 may represent speed control means in combination with an intermittent movement mechanism, such, for example, as the well-known Geneva intermittent movement mechanism. The system then may produce radiation the condition of polarization of which shifts by a finite amount at definite time intervals, that type of shifting continuing indefinitely. That type of movement of the phase shifting device will be spoken of as effectively continuous, and the resulting radiation will be considered to have an effectively continuously shifting condition of polarization. The same type of mechanism can be employed in an antenna system for receiving radiation, or in one capable of both emitting and receiving radiation.

The present invention may be effectively utilized for many purposes without specific reference to the theory that underlies its action. However, the following outline of certain aspects of that theory will contribute toward a full appreciation of the remarkable versatility and effectiveness of which the invention is capable.

Figure 8:
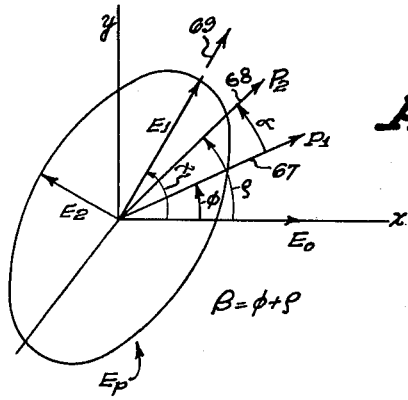
Fig. 8 is a drawing illustrating certain angular relationships.

Fig. 8 is a diagram illustrating certain relationships between quantities involved in the invention. The diagram may be considered to represent a plane perpendicular to axis 64 of Fig. 4, for example, and containing the coordinates $x$ and $y$, the $x$ axis being taken parallel to $E_0$. As indicated in Fig. 8, the angular positions of the phase shifting devices $P_1$ and $P_2$ are defined by the angles $\phi$ and $\rho$ between the $x$ axis and their respective reference planes, represented by the lines 67 and 68. The difference between those angles is denoted by $\alpha$ and their sum by $\beta$.

For clarity of discussion, the radiation $E_o$ adjacent the antenna will be considered to represent initial radiation emitted by the antenna, which is then transmitted successively by the devices $P_1$ and $P_2$, emerging as radiation $E_p$ of modified polarization characteristics. The opposite situation of incoming radiation $E_p$, transmitted successively by devices $P_2$ and $P_1$ and received in the form $E_o$ by the antenna, can readily be derived. The angle between the $x$ axis and the major axis 69 of the radiation field $E_p$ is denoted by $\chi$. Components of that field parallel and perpendicular to the major axis are indicated as $E_1$ and $E_2$.

The initial radiation field $E_o$, being linearly polarized parallel to the $x$ axis, may be represented as $$E_{ox}=E \sin wt$$
$$E_{oy}=0 \qquad (1)$$

where E represents the amplitude of the electric vector and $w$ represents the frequency of the radiation multiplied by $2\pi$.

The field (1) at the entrance to the first phase shifting device may be expressed in terms of components $E_a$, $E_b$ parallel and perpendicular, respectively, to its reference plane 67. Transmission of the radiation by the first device then produces a definite relative phase shift $d$ between the components $E_a$ and $E_b$, the phase of the parallel component $E_a$ being typically advanced by an angle $d$ with respect to $E_b$. The resulting field leaving the first phase shifting device may be written $$E_a = mE \sin(wt+d) \cos \phi$$
$$E_b = -nE \sin wt \sin \phi \qquad (2)$$

where $m$ and $n$ represent loss factors for the first device.

The effect of the second phase shifting device may be obtained by resolving the field (2) into components $E_u$ and $E_v$ parallel and perpendicular, respectively, to the reference plane 68 of the second device; and taking account of the advance of phase $D$ of $E_u$ with respect to $E_v$. The resulting field may be written $$E_u = m'E[m \sin(wt+d+D) \cos \phi \cos \alpha$$
$$\qquad -n \sin(wt+D) \sin \phi \sin \alpha]$$
$$E_v = -n'E[m \sin(wt+d) \cos \phi \sin \alpha$$
$$\qquad +n \sin wt \sin \phi \cos \alpha] \qquad (3)$$

where $m'$ and $n'$ represent loss factors for the second device.

When both devices produce a phase shift of 90°, $d$ and $D$ are both equal to 90°, and the general Expression 3 can be simplified. For further simplification, it can be assumed that the losses produced by both devices are negligible, so that $m$, $n$, $m'$ and $n'$ are all unity; and the voltage amplitude can be normalized by setting $E=1$. The field (3) can then be written $$E_u = -\sin wt \cos \phi \cos \alpha - \cos wt \sin \phi \sin \alpha$$
$$E_v = -\cos wt \cos \phi \sin \alpha - \sin wt \sin \phi \cos \alpha \qquad (4)$$

That field may be expressed in the original coordinates $x$ and $y$ by performing successive rotations through angles $-\alpha$ and $-\phi$, giving, after simplification, $$E_x = -\sin wt \cos \alpha \cos \beta + \cos wt \sin^2 \alpha$$
$$E_y = -\sin wt \cos \alpha \sin \beta - \cos wt \sin \alpha \cos \alpha \qquad (5)$$

where $\alpha = \rho - \phi$ as before and $\beta = \rho + \phi$.

Equations 4 and 5 represent, of course, the same radiation field, but in terms of coordinate systems that differ in orientation. That field corresponds in general to elliptically polarized radiation, but reduces for certain particular values of the parameters $\phi$ and $\alpha$ or of $\alpha$ and $\beta$ to circular or to linear polarization.

The angle $\chi$ between the $x$ axis and the major axis of polarization ellipse may be shown to be given by the equation $$\tan 2\chi = \frac{\cos^2 \alpha \sin 2\beta - \sin^2 \alpha \sin 2\alpha}{\cos^2 \alpha \cos 2\beta - \sin^2 \alpha \cos 2\alpha} \qquad (6)$$

The ratio $R$ of the major amplitude $E_1$ to the minor amplitude $E_2$ of the electric vector may then be found from the equation $$R^2 = \frac{1 - [\cos^2 \alpha \sin^2(\chi - \beta) + \sin^2 \alpha \cos^2(\chi - \alpha)]}{\cos^2 \alpha \sin^2(\chi - \beta) + \sin^2 \alpha \cos^2(\chi - \alpha)} \qquad (7)$$

Figure 9:
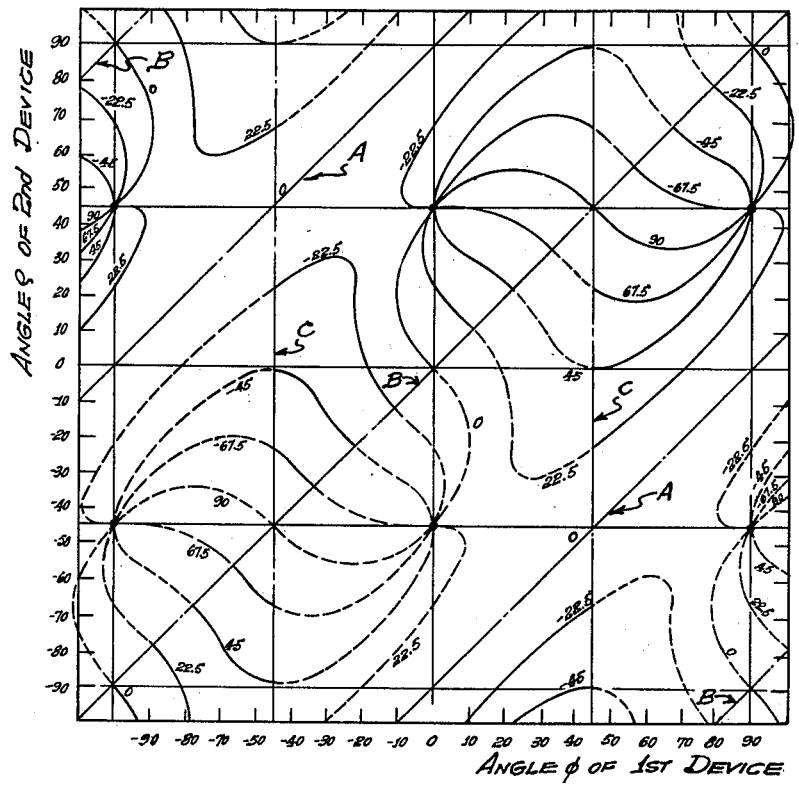
Fig. 9 is a graph displaying typical conditions of polarization obtainable in accordance with the invention.

Fig. 9 represents in graphical form the conditions of polarization resulting from certain selected values of the position angles $\phi$ and $\rho$ of the first and second phase shifting devices. Each point of the graph represents a definite pair of angles $\phi$ and $\rho$, plotted as horizontal and vertical cartesian coordinates, respectively. Due to symmetry, a change of ±180° in either $\phi$ or $\rho$ or both does not affect the performance of the system, and the graph will be seen to repeat with a period of 180° in both coordinates. For example, the data at $\phi = +90°$ and $\phi = -90°$ are identical.

The curved lines in Fig. 9 connect points for which the transmitted radiation is (in general) elliptical with definite constant values of $\chi$, which is the angle between the major axis of the ellipse and the direction of initial polarization (the $x$ axis in Fig. 8). The value of $\chi$ for each curve is noted in degrees on the graph. The sense of polarization of elliptically polarized radiation is represented by the character of the line, a solid line indicating right-handed polarization and a dashed line left-handed.

It will be noted that the sense of polarization shifts abruptly at certain definite points along the lines of equal $\chi$. At those points the transmitted radiation is linearly polarized. That linear polarization may be considered as a special case of elliptical polarization for which the ratio $R$ of the major and minor axes is infinite. The points of Fig. 9 that correspond to linearly polarized radiation are connected by dash-dot lines. Those lines are of three types, all of which appear straight in the graph. The diagonal lines A correspond to positions of the devices for which the values of $\phi$ and $\rho$ differ by 90°. That relation always leads to linearly polarized radiation at the constant angle $\chi = 0$. The phase change produced by one device is exactly canceled by that produced by the other. The polarization of the radiation therefore remains unchanged after transmission through both plates.

The diagonal lines marked B correspond to arrangements for which the angles $\phi$ and $\rho$ of the two devices are the same (or differ by 180°, which amounts to the same thing because of symmetry). When $\phi$ and $\rho$ are both zero the radiation remains polarized along the $x$ axis. When both devices are set at 45°, the direction of polarization is shifted through an angle of 90°. At suitable intermediate orientations of the two devices, radiation linearly polarized at any selected angle $\chi$ between 0 and 90° is readily obtainable. That fact may be seen directly from Fig. 9, since illustrative values of $\chi$ are obtained wherever the lines B are crossed by the curves of uniform $\chi$, already discussed. Alternatively, by setting $\alpha = 0$, $\beta = 2\phi$ in Equation 6, it may be shown that the direction of polarization $\chi$ is equal to $2\phi$. Substitution in Equation 7 then confirms that $R$ is infinite, corresponding to linear polarization. Hence, when both devices are set at the same position angle, the resulting radiation is linearly polarized at an angle $\chi = 2\phi$.

If it is only required, for example, to produce or receive linearly polarized radiation of arbitrary angle $\chi$, the two phase shifting devices may be mounted in fixed mutual relation with their reference planes coinciding. The structure of such a system can be simplified by forming the two devices integrally as a single structure, which then produces a phase difference of 180° or $\pi$ between radiation components polarized parallel and perpendicular, respectively, to the reference plane of the entire device. By suitable selection of the dimensional parameters already referred to, each of the structures illustrated in Figs. 1 to 3 may be caused to act in the manner just described.

The lines C in Fig. 9 correspond to arrangements for which the first device is set at $\phi = \pm 45°$. The second device may then be set at any arbitrary angle $\rho$ and the resulting radiation is always linearly polarized. Moreover, the direction $\chi$ of the plane of that polarization is always given by $\chi = \rho \pm 45°$, the plus sign being taken when $\phi = +45°$ and the minus sign being taken when $\phi = -45°$. Hence, that arrangement provides a convenient alternative means for obtaining radiation linearly polarized in any arbitrarily selected direction $\chi$.

Circularly polarized radiation may be produced conveniently by setting the first device at $\phi = 0$ or $\pm 90°$ and setting the second device at $\rho = \pm 45°$. Those points of circular polarization are identified in Fig. 9 by small circles. They are crossing points of the lines of constant $\chi$. The sense of rotation of the electric vector at each point of circular polarization is the same as at the adjacent portions of the curves of constant $\chi$ that cross at that point, and is indicated in the figure by the dashed or solid character of those lines, as already explained. It will be seen that right-handed circular polarization is obtained when $\rho=+45°$; left-handed when $\rho=-45°$.

The data of Fig. 9 may be plotted alternatively as functions of $\alpha$ and $\beta$. If, for example, $\alpha$ and $\beta$ are taken as vertical and horizontal cartesian coordinates, the lines A and B of Fig. 9 appear as horizontal lines and the lines C appear as diagonal lines. The curved lines of constant $\chi$ retain the same general character, but the entire grid appears rotated 45° clockwise relative to Fig. 9.

Fig. 9 has been discussed with particular reference to the types of radiation $E_p$ into which linearly polarized radiation $E_o$ is transformed for certain orientations of the mechanism. It may be considered also to show the types of radiation $E_p$ which are transformed into linearly polarized radiation $E_o$ for those same orientations of the mechanism. However, the latter viewpoint implies the opposite direction of propagation of the radiation through the apparatus, so that the "first device" is actually traversed second. The described indication of sense of rotation by means of dashed and solid lines in Fig. 9 remains unchanged. However, it must be kept in mind that by definition the sense of rotation corresponds to the direction of rotation of the electric vector as viewed in the direction of propagation, whereas the coordinates $x$ and $y$ and the various angles including $x$ are defined with respect to the apparatus.

An antenna system in accordance with the present invention, for example as shown in Fig. 4, may be set in accordance with Fig. 9 to produce radiation $E_p$ having any predetermined polarization, defined, for example, by given values of $\chi$, R and the sense of rotation. When so adjusted, the system will respond effectively to incoming radiation having the same values of $\chi$ and R, and the same sense of rotation. Moreover, the system will be substantially non-responsive to incoming radiation having polarization exactly opposite to that just described. Two radiation fields are exactly opposite in the present meaning of the term if they have the same values of R, if their electric vectors rotate in opposite senses and if their angles $\chi$ differ by 90°. Hence, an antenna system of the present type may be adjusted to substantially exclude radiation of arbitrary polarization $\chi'$, R' and sense of rotation by setting it in the manner described to receive radiation that is polarized with opposite sense of rotation, with $R=R'$, and with $\chi=\chi'\pm90°$.

I claim:

Apparatus for transforming radiofrequency radiation having a predetermined condition of polarization into radiofrequency radiation having any preselected condition of polarization, said apparatus comprising in combination first and second phase shifting devices having reference planes and pairs of axes in said reference planes, said phase shifting devices comprising means for producing a predetermined change of phase between radiation components polarized parallel and perpendicular to said reference planes, means for mounting said phase shifting devices for independent rotation and in coaxial relation about an axis perpendicular to said reference planes, means for independently rotating said phase shifting devices to a plurality of independent positions where the pairs of axes of said phase shifting devices can be angularly displaced with respect to one another, drive means for independently or simultaneously driving said phase shifting devices at selected speeds while maintaining any pre-set displacement of said axes, means for selectively coupling and uncoupling said drive means with said means for rotating said phase shifting devices, all of said means coacting whereby said phase shifting devices can be independently or simultaneously continuously rotated at any of a plurality of speeds, or independently rotated to any position.

References Cited in the file of this patent

UNITED STATES PATENTS

| | | |
|---|---|---|
| 2,438,119 | Fox | Mar. 23, 1948 |
| 2,464,269 | Smith | Mar. 15, 1949 |
| 2,554,936 | Burtner | May 29, 1951 |